(12) United States Patent
Bulters et al.

(10) Patent No.: US 6,465,572 B1
(45) Date of Patent: Oct. 15, 2002

(54) POLYMER COMPOSITION CONTAINING A PROPYLENE BLOCK COPOLYMER

(75) Inventors: Markus J. H. Bulters, Sittard; Henricus A. J. Schepens, Budel; Nicolaas J. J. Aelmans, Vlodrop, all of (NL)

(73) Assignee: DSM N.V., Heerlen (NL)

( * ) Notice: Subject to any disclaimer, the term of this patent is extended or adjusted under 35 U.S.C. 154(b) by 0 days.

(21) Appl. No.: 09/723,334

(22) Filed: Nov. 28, 2000

Related U.S. Application Data

(63) Continuation of application No. PCT/NL99/00332, filed on May 27, 1999.

(30) Foreign Application Priority Data

May 28, 1998 (NL) .............................................. 1009269

(51) Int. Cl.[7] .............................................. C08L 53/00
(52) U.S. Cl. ...................................................... 525/88
(58) Field of Search .................................... 525/323, 88

(56) References Cited

U.S. PATENT DOCUMENTS

| | | | |
|---|---|---|---|
| 5,438,091 A | | 8/1995 | Saito et al. |
| 5,461,105 A | | 10/1995 | Saito et al. |
| 5,462,987 A | * | 10/1995 | Shinonaga ................... 524/451 |
| 5,480,932 A | * | 1/1996 | Kobayashi ................... 524/451 |
| 5,744,535 A | | 4/1998 | Akagawa et al. |
| 5,889,099 A | | 3/1999 | Nagai et al. |
| 6,204,328 B1 | * | 3/2001 | Sanpei ......................... 525/89 |

FOREIGN PATENT DOCUMENTS

| | | |
|---|---|---|
| EP | 0265075 | 4/1988 |
| GB | 2161490 | 1/1986 |

* cited by examiner

*Primary Examiner*—Paul R. Michl
(74) *Attorney, Agent, or Firm*—Pillsbury Winthrop LLP

(57) ABSTRACT

Polymer composition containing:

Figure 1:
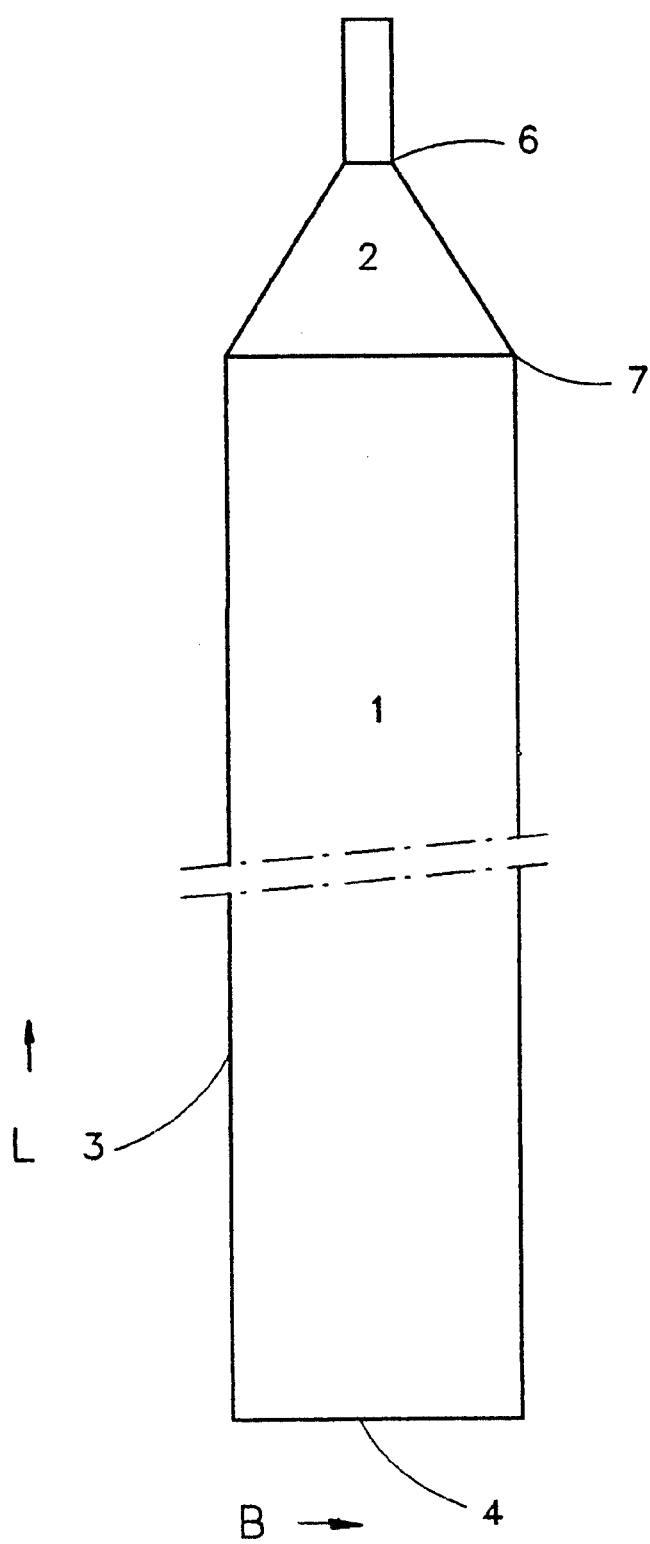

A. 100–40 wt. % of a propylene block copolymer, with a melt index of at least 1.0 dg/min (230° C., 16 kg) and containing block a1 of propylene monomer units and optionally ethylene monomer units, and block a2 of propylene monomer units and ethylene monomer units;

B. 0–30 wt. % of an impact modifier;

C. 0–50 wt. % of filler, and

D. 0.1–10 parts per 100 parts A1 of ultra high molecular weight polypropylene. These polymer compositions are useful for injection molding large parts at high injection rates without exhibiting surface defects.

24 Claims, 2 Drawing Sheets

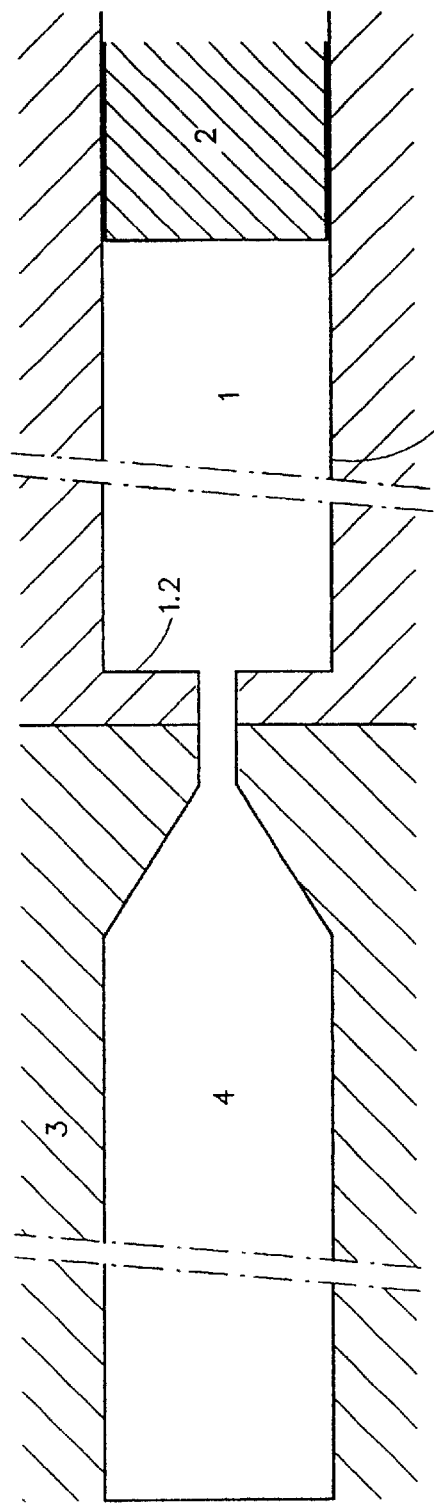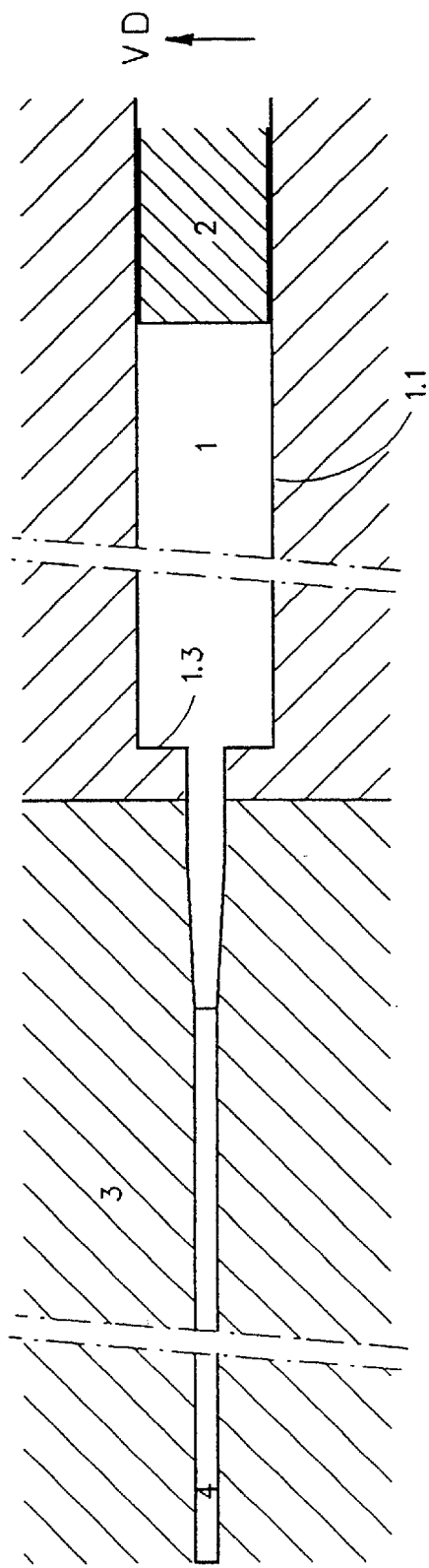

POLYMER COMPOSITION CONTAINING A PROPYLENE BLOCK COPOLYMER

This is a Continuation of: International Appln. No. PCT/NL99/00332 filed May 27, 1999 which designated the U.S.

The invention relates to a polymer composition containing a propylene block copolymer, a method for the preparation of moulded parts that contain the polymer composition and moulded parts that contain the polymer composition.

Such a polymer composition is known from EP-A-714.948.

The polymer composition is used, for example, for injection moulding of large moulded parts, such as for example garden tables, garden chairs, car bumpers and instrument panels. This means that major requirements are to be met in terms of, for example, the flow and the mechanical properties of the composition.

It is important that the large moulded parts can be injection moulded using a mould with the lowest possible number of gates. This ensures that the number of weld lines and the associated surface defects and weak spots in the moulded part is kept to a minimum. To achieve this, it is necessary for the polymer composition to be capable of being injection moulded at high injection rates so as to obtain long flow paths, which are needed for injection moulding in a mould using a minimal number of gates.

However, a major drawback of injection moulding at high injection rates is that it results in moulded parts having surface defects in the form of a stripe or wave pattern, which often extends perpendicularly to the direction of flow of the polymer composition in the mould. In practice this effect is also referred to as slipstick.

The aim of the invention is to provide a polymer composition that can be injection moulded at a high injection rate, while the moulded part thus obtained does not exhibit the surface defects, or at least exhibits them to a strongly reduced extent.

This aim is achieved by providing a polymer composition, which contains:
A. 100–40 wt. % of a propylene block copolymer, with a melt index of at least 1.0 dg/min (230° C., 2.16 kg) and containing:
95–30 wt. % of block a1, which contains 94–100 wt. % of propylene monomer units and 0–6 wt. % of ethylene monomer units,
70–5 wt. % of block a2, which contains 30–70 wt. % of propylene monomer units and 70–30 wt. % of ethylene monomer units,
B. 0–30 wt. % of an impact modifier,
C. 0–50 wt. % of filler.
which polymer composition, if injection moulded into a beam-shaped test object at at least one value for the mass temperature chosen from 220, 240, 260 or 280° C. and at least one value chosen for the injection time chosen from 0.2, 1.0 and 3.0 sec. in the mould for the test object having a length L of 330 mm, a width B of 30 mm and a height H of 3 mm, with a wall temperature of 40° C., the direction of flow of the polymer composition lying in the longitudinal direction of the test object and the melt flowing into the mould consisting in vertical direction (line VD, FIG. 4) of three layers of the polymer composition, with the outer layers having a first colour and each forming 47 vol. % of the inflowing melt, and the central layer having a second colour and making up 6 vol. % of the inflowing melt, yields a test object on the surface BL of which a periodic pattern of shapes having the first colour running in longitudinal direction is absent.

The polymer composition according to the invention has a good flow, a good impact resistance, and nevertheless the polymer composition can be injection moulded at a high injection rate and with a long flow path to yield moulded parts, with no or hardly any surface defects in the form of the wave pattern.

Preferably white is chosen as the first colour, and black is chosen as the second colour to make a test object of the polymer composition of the invention.

Preferably, a value of 0.2 sec. is chosen for the injection time and the periodic pattern of shapes having the first colour is absent from the surface of the test object. Such a polymer composition can be injection moulded into moulded parts using very large flow paths and with very few or no surface defects. Even more preferably, a value of 240, 260 or 280° C. is chosen for the mass temperature.

Preferably, the propylene block copolymer contains 80–50 wt. % of the block a1 and 50–20 wt. % of the block a2, even more preferably the propylene block copolymer contains 72–55 wt. % of the block a1 and 45–28 wt. % of the block a2.

Component B, the impact modifier, is for example a plastomer, or preferably an elastomer. Preferably, the impact modifier content is as low as possible. Preferably, its content is 0–20 parts by weight, even more preferably its content is 0–10 parts by weight. Examples of suitable elastomers are copolymers of ethylene and a second olefin with 3–10 C atoms, preferably propylene. It is also possible to use a copolymer of ethylene, propylene and one or more dienes, such as for example EPDM, as elastomer. Examples of suitable plastomers are linear low density polyethylene (lLDPE) and very low density polyethylene (vLDPE).

Preferably, the polymer composition according to the invention contains 0–15 wt. % of the elastomer and the propylene block copolymer contains 72–55 wt. % of the block a1 and 45–28 wt. % of the block a2.

As filler, use can for example be made of talc, chalk, clay, mica, clay or glass fibres and carbon fibres up to a length of 6 mm. Preferably, use is made of talc. Preferably, at least 75 wt. %, even more preferably at least 90 wt. %, of the filler particles have an aspect ratio of at least 6, even more preferably of at least 10.

Aspect ratio is understood to be the ratio between the largest and the smallest dimension of a particle.

Preferably, the melt index of the polymer composition according to the invention is at least 5, even more preferably at least 10 dg/min (230° C., 2.16 kg).

In a preferred embodiment a polymer composition is used wherein, if the polymer composition is extruded from a reservoir having a diameter of 12 mm at at least one temperature chosen from 240, 260 and 280° C. through a capillary with an inlet angle of 180° having a length of 1 mm and a diameter of 1 mm with a throughput of 110 mm³/sec, the pressure drop across the capillary is at least 1.5 MPa.

Preferably, the pressure drop across the capillary is at least 1.7 MPa, more preferably at least 2.0 MPa, even more preferably at least 2.5 MPa.

Such a pressure drop can be achieved, in spite of the low viscosity of the polymer composition, for example because the Mz/Mw ratio (measured with Gel Permeation Chromatography) of the propylene block copolymer, which the polymer composition according to the invention contains, is high enough for this.

The propylene block copolymer, which the polymer composition according to the invention contains, can in itself, for example, be prepared by means of a slurry or gas phase process for the polymerization of polypropylene, with block a1 being polymerized in a first step and block a2 in a second step. For this, wellknown catalysts can be used, such as for example Ziegler catalysts on the basis of titanium or vanadium, or metallocene catalysts on the basis of zirconium. Both continuous polymerization processes and batch polymerization processes can be used. Polymerization processes for propylene block copolymers are described in themselves for example in Polymer Science 7, Polypropylene and other Polyolefins, S. van der Ven, Elsevier, Amsterdam (1990).

The high value for the Mz/Mw ratio can for example be reached by polymerizing the block a1 of the propylene block copolymer in at least two polymerization steps, with a low-molecular weight polypropylene being produced in one polymerization step and a high molecular weight polypropylene being produced in a different polymerization step, for example by choosing different temperatures for the two polymerization steps, or for example by using a low hydrogen gas content in the feed, or not using any hydrogen gas at all, in one step and using a higher hydrogen gas content in the other step. Preferably, in the first step the low hydrogen gas content or no hydrogen gas at all is used. In practice, polymerization can be effected in two steps by, for example, using two consecutive reactors with one reaction step being carried out in each of the reactors, or by carrying out the two polymerization steps in one reactor by adapting the feed after the first polymerization step. It is also possible to add a compound that reduces the catalyst's sensitivity to hydrogen gas, for example an ester, to the reaction mixture upon completion of the first polymerization step.

Furthermore, such a polymer composition can for example be prepared by adding an ultrahigh molecular weight propylene homopolymer or random copolymer containing propylene monomers and up to 6 wt. % of ethylene monomers, with a weight average molecular weight (Mw) of at least 800,000 kg/kMol, preferably at least 1,500,000 kg/kMol, even more preferably at least 2,000,000 kg/kMol, to the propylene block copolymer in a solution, in an amount of 0.1–10 parts by weight, preferably 2–5 parts by weight, of ultrahigh molecular homopolymer or random copolymer for every 100 parts by weight of propylene block copolymer, and removing the solvent after the ultrahigh molecular homopolymer or random copolymer has been mixed with the propylene block copolymer.

The addition of ultrahigh molecular weight propylene homopolymer or random copolymer can also be performed to a part of the propylene block copolymer, to obtain a masterbatch which contains 15–40 wt % of ultrahigh molecular weight propylene polymer, whereafter the masterbatch can be mixed with additional propylene block copolymer to obtain the polymer composition of the inventon.

The moment of addition of the impact modifier and/or filler are not critical in the preparation of the polymer composition.

The invention also relates to a method in which the polymer composition according to the invention is injection moulded into moulded parts. Preferably, the polymer composition according to the invention is injection moulded into moulded parts having a thickness of 1.0–4.0 mm. The dimensionless flow path length then is preferably at least 100, more preferably 200. The dimensionless flow path length is the distance between the gate and the farthest location in the moulding to which the melt in the mould flows from the gate in question, divided by the thickness of the moulded part.

The polymer composition according to the invention is highly suitable for injection moulding into moulded parts such as, for example, a car bumper, an instrument panel, a trim and a garden table.

The invention will be elucidated on the basis of drawings (FIGS. 1–4).

Figure 2:
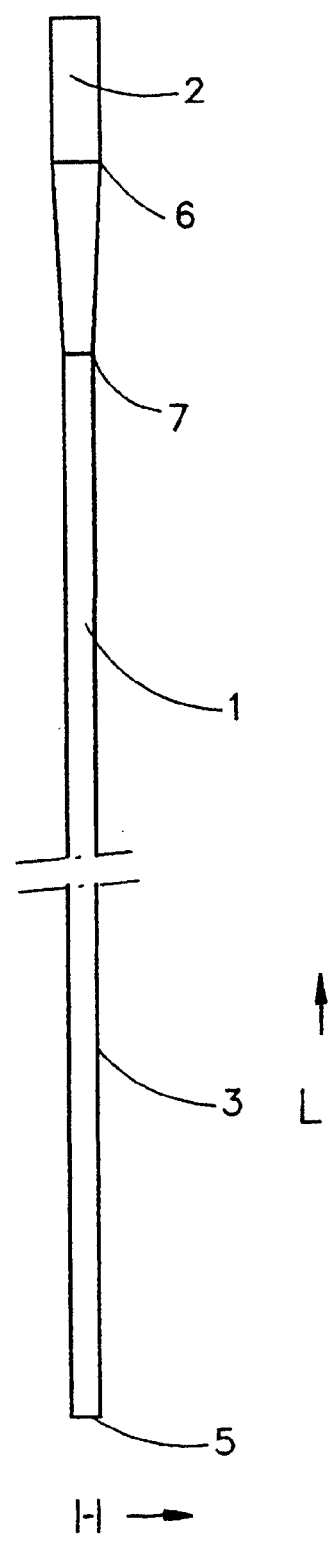

FIG. 1 and FIG. 2 present a front view and a side view of the test object.

FIG. 3 and FIG. 4 present a front and side view of a cross section of an apparatus that can be used to fill the test object with several layers of a melt.

FIG. 1 shows the beam-shaped test object (1) with gate (2). In FIG. 1 the side (3) is equal to the length L of 330 mm and the side (4) is equal to the width B of 30 mm. The cross section of the gate changes gradually, in the way shown in the FIGS., from a round cross section (6) with a diameter of 5 mm into a rectangular cross section (7) that equals the cross section of the beam-shaped test object.

FIG. 2 also shows the beam-shaped test object (1) with gate (2), but this time in side view. The side (3) is equal to the length L of 330 mm and the side (5) is equal to the height H of 3 mm.

FIG. 3 and FIG. 4 present an apparatus with a melt chamber (1), a piston (2) and a mould (3) with a cavity (4) for the test object, as described in FIGS. 1 and 2. The melt chamber 1 can be filled with an object which, in vertical direction (line VD in FIG. 4), comprises three layers of a polymer composition, the outer layers having a first colour and each accounting for 47 wt. % of the object and the central layer having a second colour and accounting for 6 wt. % of the object. The temperature in melt chamber 1 is raised to the desired value by means of 4 electrical heating elements (not shown). The melt chamber has a length (1.1) of 121 mm, a width (1.2) of 30 mm and a height (1.3) of 18 mm. The transverse direction of the mould cavity and the transverse direction of the melt chamber coincide. When the melt chamber and the polymer composition in the melt chamber have reached the desired temperature, the piston (2) is moved towards the mould (3), at a speed such that the mould fills up with the polymer composition in 0.2, 1.0 or 3.0 seconds. The mould temperature is thermostatted by means of an oil heating (not shown) at a temperature of 40° C. When the melt in the mould has cooled down, the test object can be removed from the mould.

Examples and Comparative Experiments

Components Used propylene block copolymer A: propylene block copolymer comprising 82 wt. % of block a1, which is built up of propylene monomer units, and comprising 18 wt. % of block a2, which is built up of 64 wt. % of ethylene monomer units and 36 wt. % of propylene monomer units. The propylene block copolymer has a melt index (2.16 kg, 230° C.) of 5 dg/min.

propylene block copolymer B: propylene block copolymer comprising 90 wt. % of block a1, which is built up of propylene monomer units, and comprising 10 wt. % of block a2, which is built up of 60 wt. % of propylene monomer units and 40 wt. % of ethylene monomer units. The propylene block copolymer has a melt index (2.16 kg, 230° C.) of 50 dg/min.

UHMWPP A: a propylene homopolymer having a weight average molecular weight of 2,400,000 kg/kMol.

UHMWPP B: a propylene homopolymer having a weight average molecular weight of 900,000 kg/kMol.

Elastomer A: EPM, Epsyn (TM) 7006, supplied by DSM Copolymer Inc, USA, an ethylene-propylene elastomer with a propylene content of 50 wt. %.

Comparative Experiment A

The propylene block copolymer A was coloured black using 0.3 wt. % of carbon black and it was coloured white using 0.5 wt. % titanium dioxide. In addition, 20 wt. % of talc was added, 99 wt. % of the talc particles having a diameter <10 μm.

1 mm thick black and white panels were injection moulded. From the panels sections were cut which had the length and the width of the melt chamber of the apparatus from FIG. 3. An object consisting of a stack of, successively, 8 white, one black and 8 white panels was placed in the melt chamber and the stack in the melt chamber was heated to 220° C. First the heating element furthest away from the capillary was switched on, after 20 min. the heating element next to it was switched on, 15 minutes later the next heating element was switched on and 10 min. later the last heating element. In this way the stack of panels gradually melted up in the direction of the capillary and air inclusion in the melt is avoided. 55 min. after the first heating element had been switched on the piston (2) was moved in the direction of the mould (3), at a speed such that the formed melt filled the mould with an injection time of 0.2 sec. After 60 sec. the melt had cooled down and the test object thus formed was removed from the mould. On the surfaces BL the test object had a regular pattern, running in longitudinal direction, of white shapes, visible against a black background.

The experiment was repeated as described above, but this time with injection times of 1.0 and 3.0 sec. On the surfaces BL all test objects had a regular pattern, running in longitudinal direction, of white shapes, visible against a black background.

Comparative Experiment B

Comparative experiment A was repeated, but the stack in the melt chamber was heated to 240, 260, and 280° C. On the surfaces BL all test objects had a regular pattern, running in longitudinal direction, of white shapes, visible against a black background.

Example I

Comparative experiment A was repeated, but the polymer composition used in comparative experiment A was mixed with a solution of 10 wt. % of UHMWPP A in Decalin with the aid of an twin-screw ZSK 30 (TM) type kneader, rotating in one direction, supplied by Werner and Pfleiderer, Germany. After mixing the Decalin was evaporated through a vent in the kneader. The mixing ratio was 95 parts by weight of the polymer composition and 5 parts by weight of UHMWPP A.

Subsequently, test panels were prepared as described under and according to the conditions of comparative experiments A and B. None of the test objects had a pattern of white shapes on the surfaces BL, but the test objects practically entirely had a uniform black colour.

Example II

To a polymer composition according to the invention of propylene block copolymer A 30 wt. % of elastomer A, 10 wt. talc, 99 wt. % of the particles of which contained a diameter <10 μm, and containing 0.3 wt. % carbon black or 0.5 wt. % of titanium dioxide, was mixed with a solution of 10 wt. % UHMWPP B in Decalin as described in Example 1. After the mixing the Decalin was evaporated through the vent in the kneader. The mixing ratio was 98 parts by weight of the polymer composition and 2 parts by weight of UHMWPP B. From the mixture thus obtained test objects were prepared as described in the comparative experiments A and B. The stack was heated to 240 and 280° C., respectively, in the melt chamber. At these temperatures the injection times were 0, 2, 1.0 and 3.0 sec.

At 240° C. none of the test objects had a pattern of white shapes on the surfaces BL, but they were almost entirely of a uniform black colour. At 280° C. the test objects obtained at injection times of 0.2 and 1.0 sec. had a regular pattern of white shapes on the surfaces BL.

The mixture was subsequently extruded at 240 and 280° C. through a capillary with a length of 1 mm and a diameter of 1 mm, from a reservoir with a diameter of 12 mm and with a throughput of 110 mm$^3$/sec.

The pressure drop across the capillary was 2,3 MPa at 240° C. and 1,4 MPa at 280° C. This proves that the test objects have no pattern of white shapes if the pressure drop is at least 1,5 MPa.

Comparative Experiment C

Example 1 was repeated, but this time the UHMWPP A was not mixed in solution but as such with the propylene block copolymer B. On the surfaces BL all test objects had a regular pattern, running in longitudinal direction, of white shapes, visible against a black background.

Apparently, it is important that the UHMWPP is in solution when it is mixed with the propylene block copolymer. This is probably because this results in better, molecular mixing.

What is claimed is:

1. Polymer composition comprising:
    A. 100–40 wt. % of a propylene block copolymer, with a melt index of at least 1.0 dg/min, measured at 230° C. and 2.16 kg, and containing:
        a. 95–30 wt. % of block a1, which contains
            (i) 94–100 wt. % of propylene monomer units and
            (ii) 0–6 wt. % of ethylene monomer units;
        b. 70–5 wt. % of block a2, which contains
            (i) 30–70 wt. % of propylene monomer units and
            (ii) 70–30 wt. % of ethylene monomer units;
    B. 0–30 wt. % of an impact modifier;
    C. 0–50 wt. % of filler; and
    D. 0.1–10 parts by weight of ultrahigh molecular weight propylene homopolymer or random copolymer containing propylene and ethylene monomers, the amount of ethylene monomers being up to 6 wt. % with a weight average molecular weight of at least 800,000 kg/kMol, per 100 parts by weight of the propylene block copolymer.

2. Polymer composition according to claim 1, wherein the ultrahigh molecular polypropylene is added in a solution.

3. Polymer composition according to claim 1, wherein said polymer composition, when injection molded into a beam-shaped test object at at least one value for the mass temperature chosen from 220° C., 240° C., 260° C. or 280° C. and at least one value for the injection time chosen from 0.2, 1.0 and 3.0 sec. in the mold, the test object having a length L of 330 mm, a width B of 30 mm and a height of 3 mm, with a wall temperature of 40° C., the direction of flow of the polymer composition lying in the longitudinal direction of the test object and the melt flowing into the mold consisting, in vertical direction (line VD), of three layers of the polymer composition, with the outer layers having a first color and each accounting for 47 vol. % of the inflowing melt and the center layer having a second color and accounting for 6 vol. % of the inflowing melt, yields a test object on the surface BL of which a periodic pattern of shapes with the first color running in longitudinal direction is absent.

4. Polymer composition according to claim 2, wherein the value of 0.2 seconds is chosen for the injection time.

5. Polymer composition according to claim 1, further comprising up to 20 wt. % of elastomer.

6. Polymer composition according to claim 1, wherein said melt index is at least 5 dg/min.

7. Polymer composition according to claim 1, wherein, if the polymer composition is extruded from a reservoir having a diameter of 12 mm, at at least one temperature chosen from 240° C., 260° C. and 280° C., through a capillary with an inlet angle of 180, and having a length of 1 mm and a diameter of 1 mm, with a throughput of 110 mm$^3$/sec, the pressure drop across the capillary is at least 1.5 Mpa.

8. Polymer composition according the claim 7, wherein the pressure drop is at least 1.7 Mpa.

9. Polymer composition according to claim 7, wherein the pressure drop is at least 2.0 Mpa.

10. Polymer composition according to claim 1, wherein said impact modifier is present.

11. Polymer composition according to claim 1, wherein said filler is present.

12. Polymer composition according to claim 3, wherein polymer block a1 contains 100 weight percent of propylene monomer units.

13. Polymer composition according to claim 1, wherein the propylene block copolymer A comprises 80 to 50 wt. % of block a1 and 50 to 20 wt. % of block a2.

14. Polymer composition according to claim 1, wherein the propylene block copolymer A comprises 75 to 55 wt. % of block a1 and 45 to 28 wt. % of block a2.

15. Polymer composition according to claim 1, which comprises from 2 to 5 parts by weight of the ultrahigh molecular weight polypropylene.

16. Polymer composition according to claim 1, wherein D is said ultrahigh molecular weight propylene homopolymer.

17. Polymer composition according to claim 1, wherein D is said ultrahigh molecular weight random copolymer.

18. Polymer composition according to claim 1, wherein the ultrahigh molecular weight polypropylene has a weight average molecular weight of at least 1,500,000 kg/kmol.

19. Polymer composition according to claim 1, wherein the ultrahigh molecular weight polypropylene has a weight average molecular weight of at least 2,000,000 kg/kmol.

20. Method for forming molded parts comprising injection molding the polymer composition of claim 1.

21. Method according to claim 20, wherein said molded parts have a wall thickness of from 1.0 to 4.0 millimeters.

22. Method according to claim 21, which comprises carrying out said injection molding with a dimensionless flow path of at least 100.

23. Method according to claim 20, which comprises carrying out said injection molding with a dimensionless flow path of at least 100.

24. Molded part comprised of the polymer composition of claim 1.

* * * * *

UNITED STATES PATENT AND TRADEMARK OFFICE
CERTIFICATE OF CORRECTION

PATENT NO. : 6,465,572 B1 Page 1 of 1
DATED : October 15, 2002
INVENTOR(S) : Bulters et al.

It is certified that error appears in the above-identified patent and that said Letters Patent is hereby corrected as shown below:

Column 6,
Line 43, after "wt. %", insert a comma ",".
Line 48, delete "polypropylene" and insert -- weight propylene homopolymer or random copolymer --.
Line 55, after "height" insert -- H --.

Signed and Sealed this

Twentieth Day of May, 2003

JAMES E. ROGAN
*Director of the United States Patent and Trademark Office*